United States Patent Office 3,704,246
Patented Nov. 28, 1972

3,704,246
AMINO ACID DERIVATIVES
Miklos Bodanszky, Shaker Heights, Ohio, assignor to
E. R. Squibb & Sons, Inc., New York, N.Y.
No Drawing. Continuation-in-part of application Ser. No. 798,790, Feb. 12, 1969, which is a continuation-in-part of abandoned application Ser. No. 451,609, Apr. 28, 1965. This application Dec. 16, 1970, Ser. No. 98,924
Int. Cl. C07d 87/54
U.S. Cl. 260—333    9 Claims

ABSTRACT OF THE DISCLOSURE

New lactone intermediates useful in the synthesis of peptides are prepared by reacting an α-amino acid with an active carbonyl compound which forms a Schiff's base. The latter is treated with a condensing agent so that cyclization occurs and a lactone is formed from which a peptide may be produced by reaction with an amino acid ester removal of the protecting groups.

---

This application is a continuation-in-part of copending application Ser. No. 798,790, filed Feb. 12, 1969, now abandoned, which in turn is a continuation-in-part of application Ser. No. 451,609, filed Apr. 28, 1965, now abandoned.

This invention relates to new intermediates useful in the synthesis of peptides. More particularly, the invention relates to amino acid derivatives, especially derivatives of α-amino acids, which are simultaneously protected and activated for reaction with other amino acids in the synthesis of peptides.

In the usual synthesis of peptides, two amino acids are joined "head to tail," i.e., the carbonyl group of the acid moiety of one amino acid is joined to the amino group of the second amino acid. It is conventional in such a synthesis to protect the reactive amino group of one amino acid with a readily removable protective group such as a benzyloxycarbonyl, t-butyloxycarbonyl, phthalyl, tosyl group, etc., so that the amino group does not enter into the reaction. Then the carbonyl group of the same amino acid is activated with another group, e.g., with an azide or with an ester group such as the p-nitrophenyl ester, so that the carbonyl group will react with or actylate the amino group of the second amino acid in the presence of the protecting group.

This procedure, it is evident, requires two distinct reactions with two separate compounds in preparation of the one amino acid for the ultimate reaction with the second amino acid. It further requires the combination of two proper groups which will give the desired protection and activation of the particular amino acid involved.

BRIEF SUMMARY OF THE INVENTION

It has now been found that α-amino acids can be both protected and activated by reacting the amino acid with a single compound and then forming a lactone. This method and the novel lactones formed thereby form the essence of this invention. These lactones readily react with α-amino acid esters to form condensation products from which the protecting-activating moiety is readily removed to leave the desired peptide.

Briefly, the method comprises reacting an α-amino acid with an active carbonyl compound which forms a Schiff's base and then the Schiff's base is treated with a condensing agent to induce cyclization and yield a lactone of the formula

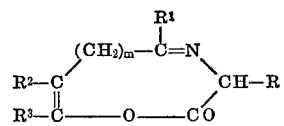

(I)

wherein R is the residue of an α-amino acid, $R^1$ is hydrogen, lower alkyl, hydroxy-substituted lower alkyl, or lower alkyl lower alkoxy; $R^2$ and $R^3$ each is hydrogen, lower alkyl, hydroxy-substituted lower alkyl, lower alkyl lower alkoxy, or $R^2$ and $R^3$ together with the carbons to which they are joined form a phenyl ring which may be unsubstituted or substituted by halogen or nitro, and $m$ is an integer from 0 to 3.

DETAILED DESCRIPTION OF THE INVENTION

Any α-amino acid may be treated according to this invention. This includes the naturally occurring α-amino acids [see for example, Hackh's Chemical Dictionary, 3rd ed. (1944), pages 44–45] as well as synthetic α-amino acids. Some examples are monoaminocarboxylic aliphatic acids, e.g., glycine, α-aminoheptylic acid, α-aminocaprylic acid, α-aminononylic acid, α-aminodecylic acid, α-aminoundecylic acid, alanine, serine, cysteine, threonine, methionine, valine, leucine, isoleucine; aromatic monoaminomonocarboxylic acids, e.g., phenylalanine, tyrosine, dihydroxyphenylalanine, 3,5-dibromotyrosine, 3-iodotyrosine, 3,5-diiodotyrosine, 3,5,3'-triiodothyronine, and thyroxine; monoaminodicarboxylic acids and their amides, e.g., aspartic acid, glutamic acid, asparagine and glutamine; diaminomonocarboxylic acids, e.g., lysine, hydroxylysine, ornithine and arginine; heterocyclic amino acids, e.g., histidine, tryptophane, proline, hydroxyproline, thiolhistidine; diaminocarboxylic acids, e.g., cystine, lanthionine and djenkolic; as well as α-amino acids of the same type found in special sources, e.g., phenylglycine, butyrine, citrulline, homocystine, hypoglycin A, S-methylcysteine sulfoxide, alliin and canavanine.

Other amino acids are aminomalonic acid, α-aminoadipic acid, α-aminopimelic acid, α-aminosuberic acid, α-aminosebacic acid, β-hydroxyaspartic acid, cystine-β,β-dicarboxylic acid, β-hydroxyglutamic acid, β-methylaspartic acid, β-methyl-β-hydroxyaspartic acid, β-methylglutamic acid, β,β-dimethylaspartic acid, γ-hydroxyglutamic acid, β,γ-dihydroxyglutamic acid, β-phenylglutamic acid, γ-methyleneglutamic acid, α-aminotricarballyic acid, β-aminoalanine, γ-aminobutyrine, homoarginine, homocitrulline, α,α'-diaminosuccinic acid, α,α'-diaminoglutaric acid, α,α'-diaminoadipic acid, α,α'-diaminopimelic acid, α,α'-diamino-β-hydroxypimelic acid, α,α'-diaminosuberic acid, α,α'-diaminoazelaic acid, α,α'-diaminosebacic acid, α,α'-diaminodecanedicarboxylic acid, α,α'-diaminododecanedicarboxylic acid, γ-methylproline, pipecolic acid, baikiain, 5-hydroxypipecolic acid, azetidine-2-carboxylic acid, β-phenylserine, canaline, γ-oxalysine, γ-hydroxyornithine, and 2-hexosaminic acids. A comprehensive discussion of amino acids, including those mentioned above is to be found in Chemistry of the Amino Acids, Greenstein et al., vol. III, Wiley, 1961. Other amino acids in addition to those listed are to be found in this volume but for sake of brevity are not specifically mentioned herein, but are included by reference. It is to be understood that the present invention is applicable to any amino acid.

The amino acid of the formula

wherein R is the residue of the amino acid is reacted with a carbonyl compound to produce a Schiff's base. These carbonyl compounds are aldehydes or ketones having the structural formula

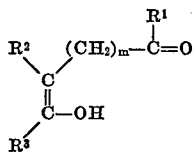

wherein R¹ is hydrogen or a straight or branched chain lower alkyl radical of from 1 to 4 carbon atoms; R² and R³ each is hydrogen, a lower alkyl radical, a hydroxy-substituted lower alkyl radical, a lower alkyl lower alkoxy radical, each of said radicals being straight or branched chain of from 1 to 4 carbon atoms; R² and R³ taken together with the carbon atoms to which they are joined are a phenyl ring which may be unsubstituted or which may be substituted by halogen or nitro; m is an integer from 0 to 7 when the carbonyl compound is aliphatic and an integer from 0 to 3 when the carbonyl compound is aromatic.

Examples of suitable aliphatic carbonyl compounds are the enol forms of the following compounds:

malondialdehyde
3-ketobutyral
succindialdehyde
4-ketopentanal
glutardialdehyde
2,4-pentanedione
4-ketohexanal
adipdialdehyde
2,4-hexanedione
2,5-hexanedione
2-methyl-3-ketopentanal
2-methyl-4-ketopentanal
3-methylpentanedial
2-ethylsuccindialdehyde
3-methyl-2,4-pentanedione
2,4-heptanedione
2-methyl-3,5-hexanedione
2-methyl-4-ketohexanal
3-methyl-2,4-hexanedione
3-ethyl-2,4-pentanedione
2,2-dimethyl-3-ketopentanal
3,3-dimethyl-2,4-pentanedione
octanedial
decandial
1-ethoxy-2,4-pentanedione
1-methoxy-3-ethoxymethyl-2,4-pentanedione
1-methoxy-2,4-hexanedione
2-methyl-4-ketohexa-3-ene-6-al
2,4-diketohexanol
3-methyl-2,4-diketopentanol
2,4-diketo-6-hydroxyheptanol
3-ethyl-2,4-diketopentanol Examples of aromatic carbonyl compounds are the following:

salicylaldehyde
3-chlorosalicylaldehyde
5-chlorosalicylaldehyde
3-bromosalicylaldehyde
4-bromosalicylaldehyde
5-bromosalicylaldehyde
5-iodosalicylaldehyde
3-nitrosalicylaldehyde
5-nitrosalicylaldehyde
o-hydroxyphenylacetaldehyde
o-hydroxyphenylpropionaldehyde Preferred are benzaldehydes of the formula

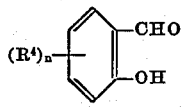

wherein R⁴ is hydrogen, halo, especially chloro or bromo, or nitro, and n is 1, 2 or 3. Most preferred are salicyl-aldehydes having a nitro or chloro group with the substituent meta or para but especially meta to the aldehyde group.

The amino acid is reacted with the aldehyde or ketone in an inert solvent, preferably an inert organic solvent such as dimethylformamide, dioxane, pyridine or the like under conventional conditions for forming a Schiff's base. Then, after the Schiff's base has formed, without isolating the base unless desired, a condensing agent is added to the reaction mixture to form the lactone. An alcohol may also be used as the reaction medium in which the Schiff's base is formed, but in this case the solvent must be removed before adding the condensing agent.

Any condensing agent which promotes the formation of acyl esters may be used. These include, for example, dicycloalkylcarbodiimides, e.g., dicyclohexylcarbodiimide; dialkylcarbodiimides, e.g., dipropylcarbodiimide; diarylcarbodiimides, e.g., diphenylcarbodiimide; alkoxyacetylenes, e.g., ethoxyacetylene, diphenylketene, etc. Dicyclohexylcarbodiimide and ethoxyacetylene are preferred. About one mol or more of condensing agent per mol of Schiff's base may be used. A mol ratio of about 1:1 may be used when the condensing agent is a carbodiimide. An excess of the condensing agent is preferable when other condensing agents are used.

Sufficient time must elapse for the Schiff's base to form before the condensing agent is introduced. The time period may vary within rather broad limits depending upon the particular reactants, but a period of about one hour to about twenty-four hours is generally adequate. Stirring and/or heating will of course accelerate the reaction. Temperatures in the range of about 15° to 60° C. may be used.

The cyclization reaction which occurs upon addition of the condensing agent must be effected in an anhydrous medium and the solvent must be one which has no reactive hydroxy or carboxy group. Media such as those named above, except alcohols, may be used for the cyclization as well. Room temperature up to about 60° C. may be used, with a temperature in the lower end of the range preferred for carbodiimides and a temperature at the higher end of the range for alkoxyacetylenes.

According to one modification, the amino acid and aldehyde are dissolved in the solvent and stirred for about one hour to twenty-four hours. Then, without isolating the Schiff's base, or after merely concentrating the solution, the condensing agent is added.

The protected-activated lactones which are formed by the procedure described have the general Formula I given above wherein the symbols have the same meaning as previously defined.

Preferred are the lactones of the formula

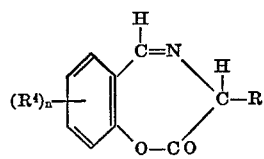

wherein R, R⁴ and n have the meaning described previously and especially those wherein R is lower alkyl, R⁴ is nitro and n is 1.

The active lactones of this invention will then react with another amino acid, preferably a simple ester thereof, such as a lower alkyl ester whereupon the ring opens and the amino acid is acylated. Treatment with aqueous acid, e.g., with hydrochloric acid, dilute sulfuric acid or the like, removes the protecting groups and the desired peptide is obtained.

It will be appreciated that the process of this invention is not limited to the formation of dipeptides from monomeric amino acids but applies as well to the formation of polypeptides from reactants having more than one amino acid moiety, e.g., the formation of tripeptides, tetrapeptides, pentapeptides, hexapeptides, octapeptides, decapeptides, etc. When the amino acid used has another reactive functional group elsewhere in the molecule, this may have to be independently protected in the conventional manner.

The following examples illustrate the invention without, however, limiting the same thereto. All temperatures given are in degrees centigrade.

Example 1.—2-hydroxy-5-nitrobenzylidene-L-leucine and its lactone

L-leucine (2.62 g.) and 5-nitrosalicylaldehyde (5.0 g.) are added to a mixture of absolute ethanol (750 ml.) and methanol (50 ml.). The mixture is stirred at room temperature for several hours. When all the leucine is dissolved, the solvents are removed in vacuo. The residue extracted with ether, the ether extracts concentrated and diluted with hexane. A crystalline solid separates. It is filtered and washed with hexane. The crude Schiff base (dec. at ca. 175–180° completely melting at ca. 200°) is used in the cyclization step without additional purification. The benzylidene derivative (1.40 g.) is dissolved in tetrahydrofuran (40 ml.) and dicyclohexylcarbodiimide (1.03 g.) is added to the solution. After about two hours at room temperature, the completion of the reaction is checked with the IR spectrum of a sample (disappearance of the strong band at $4.8\mu$, corresponding to the CN bond of the diimide, and appearance of the carbonyl band of the active ester at $5.65\mu$. The by-product, mainly N,N'-dicyclohexyl urea, is removed by filtration and washed with tetrahydrofuran (20 ml.) The filtrate and washings are concentrated in vacuo to dryness, the residue is dissolved in ether, and the solution is diluted with hexane. The active ester is obtained in good yield in the form of crystals with strong double refraction. The product has a poorly defined melting point.

The lactone obtained above and glycine ethyl ester are reacted in chloroform. Dilute hdrochloric acid is added to the reaction mixture and L-leucyl glycine ethyl ester is obtained as the product.

Example 2.—2-hydroxy-5-chlorobenzylidene-L-alanine lactone 5-chlorosalicylaldehyde (0.157 g.) and L-alanine (0.91 g.) are added to dimethylformamide (10 ml.). After 24 hours at room temperature dicyclohexylcarbodiimide (0.206 g.) is added to the solution. The formation of a CO band at $5.65\mu$ reaches its maximum in about 2 hours. The precipitated dicyclohexylurea is removed by centrifugation and the active lactone which has the structural formula

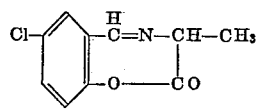

is precipitated by the addition of ether (50 ml.) to the decanted supernatant solution (IR $5.65\mu$).

Example 3

L-phenylalanine (0.165 g.) and 3-formyl-N-hydroxyphthalimide (0.19 g.) are suspended in methanol and the mixture is stirred until complete solution occurs. The methanol is removed in vacuo, tetrahydrofuran (3 ml.) and ethoxyacetylene (3 ml.) are added to the residue and the resulting solution is heated to boiling under reflux condenser for one hour. The solvent and the excess ethoxy-acetylene are removed in vacuo, tetrahydrofuran (3 ml.) and ethoxyacetylene (3 ml.) are added to the residue and the resulting solution is heated to boiling under a reflux condenser for one hour. The solvent and the excess ethoxy-acetylene are removed in vacuo and the residue is triturated with ether to yield the active acetone (IR $5.6\mu$) having the formula

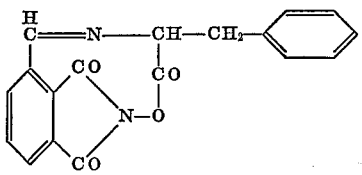

Example 4

L-serine (0.105 g.) is reacted with α-formyl-N-hydroxysuccinimide (0.15 g.) as described in Example 3. The Schiff base is obtained by removing the solvent and then reacting with ethoxyacetylene to obtain the active lactone (IR $5.6\mu$) having the formula

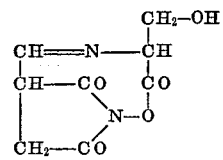

Example 5

L-glutamine (1.5 g.) and 4-acetyl-N-hydroxypiperidine (1.5 g.) are stirred in ethanol (100 ml.) for 24 hours. The solvent is removed in vacuo and the residue is treated with dicyclohexylcarbodiimide (2.1 g.) in tetrahydrofuran (20 ml.). After 3 hours at room temperature, the precipitated N,N'-dicyclohexylurea is removed by centrifugation and the supernatant solution, which contains the active lactane having the structural formula

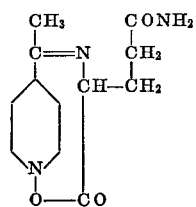

is used for the synthesis of glutaminyl derivatives.

Example 6

To a solution of the Schiff base from 2,4-pentadione and methionine having the formula

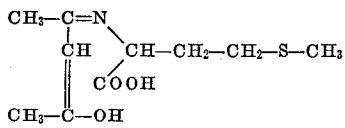

(23.2 g.) in dimethylformamide (200 ml.), dicyclohexylcarbodiimide (21 g.) is added. After two hours at room temperature, the precipitated N,N'-dicyclohexylurea is filtered off and the filtrate which contains the active lactone (IR $5.56\mu$) having the formula

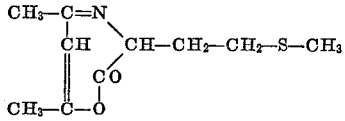

is used in peptide synthesis.

Examples 7–26

Following the procedure of Example 3, but protecting reactive side chains where necessary and substituting for L-phenylalanine the amino acid indicated in column I, and for 3-formyl - N - hydroxyphthalimide the carbonyl compound indicated in column II, there is obtained the compound (or mixture of compounds) of Formula I wherein the substituents R, $R^1$, $R^2$, $R^3$ and $m$ are as indicated in column III:

| Example | I Amino acid | II Carbonyl compound | R | R¹ | R² | R³ | m |
|---|---|---|---|---|---|---|---|
| 7 | L-glycine | Malondialdehyde | —H | —H | —H | —H | 0 |
| 8 | L-alanine | 3-ketobutyral | {—CH₃ / —CH₃} | —H / —CH₃ | —H / —H | —CH₃ / —H | 0 / 0 |
| 9 | L-serine | | {—CH₂OH / —CH₂OH} | —H / —CH₃ | —H / —H | —CH₃ / —H | 0 / 0 |
| 10 | L-glycine | Succindialdehyde | —H | —H | —H | —H | 1 |
| 11 | do | 4-ketopentanal | {—H / —H} | —H / —CH₃ | —H / —H | —CH₃ / —H | 1 / 1 |
| 12 | L-cysteine | Glutardialdehyde | —CH₂SH | —H | —H | —H | 2 |
| 13 | L-threonine | 4-ketohexanal | {—CH—CH₃ \| OH / Same as above} | —H / —CH₂CH₃ | —H / —H | —CH₂CH₃ / —H | 1 / 1 |
| 14 | L-glycine | Adipaldehyde | —H | —H | —H | —H | 3 |
| 15 | L-valine | 2,4-hexanedione | {—CH(CH₃)CH₃ / Same as above} | —CH₂CH₃ / —CH₃ | —H / —H | —CH₃ / —CH₂CH₃ | 0 / 0 |
| 16 | L-isoleucine | 2,5-hexanedione | —CH—CH₂—CH₃ \| CH₃ | —CH₃ | —H | —CH₃ | 1 |
| 17 | L-aspartic | 2-methyl-3-ketopentanal | {—CH₂—CO₂H / —CH₂—CO₂H} | —H / —CH₂CH₃ | —CH₃ / —CH₃ | —CH₂CH₃ / —H | 0 / 0 |
| 18 | L-glycine | 2-methyl-4-ketopentanal | {—H / —H} | —H / —CH₃ | —H / —H | —CH₃ / —CH₃ | 1 / 0 |
| 19 | do | 3-methylpentanedial | —H | —H | —H | —H | 2 |
| 20 | L-alanine | Octanedial | —CH₃ | —H | —H | —H | 5 |
| 21 | do | Pentanedial | —CH₃ | —H | —H | —H | 7 |
| 22 | L-glycine | 2-methyl-4-ketohexa-3-ene-6-al | —H | —H | —H | =CH—CH(CH₃)CH₃ | 0 |
| 23 | L-alanine | 2,4-diketohexanol | —CH₃ | —CH₂CH₃ | —H | —CH₂OH | 0 |
| 24 | do | 3-methyl-2,4-diketopentanol | {—CH₃ / —CH₃} | —CH₃ / —CH₂OH | —CH₃ / —CH₃ | —CH₂OH / —CH₃ | 0 / 0 |
| 25 | do | 2,4-diketo-6-hydroxyheptanol | {—CH₃ / —CH₃} | —CH₂—CHOH—C—H₃ / —CH₂OH | —H / —H | —CH₂OH / —CH₂—CHOH—CH₃ | 0 / 0 |
| 26 | do | 1-ethoxy-2,4-pentanedione | {—CH₃ / —CH₃} | —CH₃ / —CH₂—OCH₂—CH₃ | —H / —H | —CH₂OCH₂—CH₃ / —CH₃ | 0 / 0 |

Examples 27–37

Following the procedure of Example 1, but protecting the reactive side chains where necessary and substituting for L-leucine the amino acid indicated in column I and for 5-nitrosalicylaldehyde the carbonyl compound indicated in column II, there is obtained the compound of the following formula

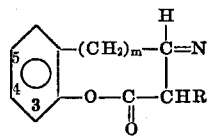

wherein the substituent R is the residue of the amino acid indicated in column I and wherein the substituent in the 3-, 4- or 5-position is the same as that of the starting salicylaldehyde, and m has the value indicated in column III.

| Example: | I | II | III |
|---|---|---|---|
| 27 | L-lysine | Salicylaldehyde | 0 |
| 28 | L-hydroxylysine | 3-chlorosalicylaldehyde | 0 |
| 29 | L-cysteine | 5-chlorosalicylaldehyde | 0 |
| 30 | L-tyrosine | 3-bromosalicylaldehyde | 0 |
| 31 | L-tryptophane | 4-bromosalicylaldehyde | 0 |
| 32 | L-proline | 5-bromosalicylaldehyde | 0 |
| 33 | L-histidine | 5-iodosalicylaldehyde | 0 |
| 34 | L-hydroxyproline | 3-nitrosalicylaldehyde | 0 |
| 35 | L-glycine | 5-nitrosalicylaldehyde | 0 |
| 36 | L-alanine | o-Hydroxyphenylacetaldehyde | 1 |
| 37 | do | o-Hydroxyphenylpropionaldehyde | 2 |

What is claimed is:
1. A compound of the formula

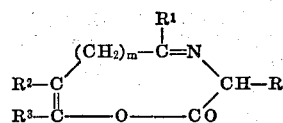

wherein R is the residue of an α-amino acid, R¹ is hydrogen, a straight or branched chain lower alkyl radical, a hydroxy-substituted or alkoxy-substituted lower alkyl radical, R² and R³ are hydrogen, a straight or branched chain lower alkyl radical, or a hydroxy-substituted or alkoxy-substituted lower alkyl radical, each of said radicals being straight or branched chain of from 1 to 4 carbon atoms; or R² and R³ taken together with the carbon atoms to which they are joined complete a phenyl ring which may be unsubstituted or substituted by halogen or nitro, provided that when R² and R³ complete a phenyl ring, R¹ is hydrogen; m is an integer from 0 to 7 when R² and R³ are not phenyl or an integer from 0 to 3 when R² and R³ are phenyl.

2. A compound according to claim 1 having the formula

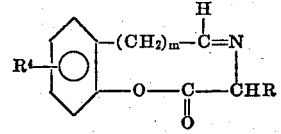

wherein R is as defined in claim 1, m is an integer from 0 to 3 and wherein R⁴ is hydrogen, halogen or nitro.

3. A compound according to claim 2 having the name 2-hydroxy-5-nitrobenzylidene-L-leucine lactone.

4. A compound according to claim 2 having the name 2-hydroxy-5-chlorobenzylidene-L-alanine lactone.

5. A compound according to claim 2 wherein R is lower alkyl.

6. A compound according to claim 2 wherein R is lower alkyl and $R^4$ is nitro.

7. A compound according to claim 2 wherein R is lower alkyl and $R^4$ is halogen.

8. A compound according to claim 1 having the formula

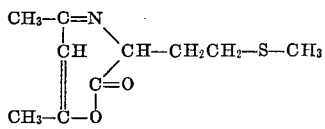

9. A method for forming a compound of claim 1 comprising reacting an α-amino acid of the formula

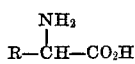

wherein R is the residue of the amino acid with an aldehyde or ketone having the formula

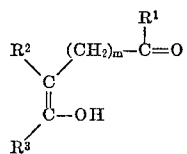

wherein $R^1$, $R^2$, $R^3$ and $m$ are as defined in claim 1, in an inert organic solvent at a temperature in the range of about 15° to 60° C. and then adding a carbodiimide or alkoxyacetylene condensing agent under anhydrous conditions at room temperature up to about 60° C. to the Schiff's base to form a lactone.

No references cited.

NORMA S. MILESTONE, Primary Examiner

U.S. Cl. X.R.

260—112.5, 309, 326.14 T, 326.85, 519, 534 R, 534 M, 534 S, 534 C, 534 E, 534 G, 534 L

UNITED STATES PATENT OFFICE
CERTIFICATE OF CORRECTION

Patent No. 3,704,246            Dated November 28, 1972

Inventor(s) Miklos Bodanszky

It is certified that error appears in the above-identified patent and that said Letters Patent are hereby corrected as shown below:

Column 1, line 21, "ester removal" should read --ester and removal--.
Column 1, line 47, "actylate" should read --acylate--.
Column 2, line 34, "diaminocarboxylic" should read --diaminodicarboxylic--.
Column 5, line 31, "cyclohexyl urea" should read --cyclohexylurea--.
Column 6, line 31, "lactane" should read --lactone--.
Example 25, column III $R^1$, "$-CH_2-CHOH-C-H_3$" should read -- $-CH_2-CHOH-CH_3$ --.

Signed and sealed this 29th day of May 1973.

(SEAL)
Attest:

EDWARD M. FLETCHER, JR.            ROBERT GOTTSCHALK
Attesting Officer                  Commissioner of Patents